United States Patent
Inaba et al.

(10) Patent No.: US 7,281,703 B2
(45) Date of Patent: Oct. 16, 2007

(54) LIQUID-TO-GAS CONTACT DEVICE

(75) Inventors: Tsunezo Inaba, Chita-gun (JP); Fumio Abe, Handa (JP); Takeyoshi Kawahara, Tajimi (JP); Yukio Miyairi, Nagoya (JP)

(73) Assignee: NGK Insulators, Ltd., Nagoya (JP)

( * ) Notice: Subject to any disclaimer, the term of this patent is extended or adjusted under 35 U.S.C. 154(b) by 509 days.

(21) Appl. No.: 10/483,811

(22) PCT Filed: Jul. 29, 2002

(86) PCT No.: PCT/JP02/07667

§ 371 (c)(1),
(2), (4) Date: Jan. 15, 2004

(87) PCT Pub. No.: WO03/011419

PCT Pub. Date: Feb. 13, 2003

(65) Prior Publication Data

US 2004/0179982 A1    Sep. 16, 2004

(30) Foreign Application Priority Data

Jul. 30, 2001    (JP)    ............... PCT/JP01/06522

(51) Int. Cl.
   *B01D 47/16*    (2006.01)
(52) U.S. Cl. .............. 261/94; 261/95; 261/119.1; 95/213; 96/294; 96/278; 96/274
(58) Field of Classification Search ........... 96/294, 96/278, 274; 95/213; 261/94, 95, 119.1; 422/129
See application file for complete search history.

(56) References Cited

U.S. PATENT DOCUMENTS

| 3,823,926 | A | * | 7/1974 | Bracich | ............. 261/106 |
| 4,882,130 | A | * | 11/1989 | Asai et al. | ............. 422/310 |
| 2004/0237781 | A1 | * | 12/2004 | Terada et al. | ............. 95/211 |

FOREIGN PATENT DOCUMENTS

| EP | 0 121 445 A1 | 10/1984 |
| EP | 1 162 171 A1 | 12/2001 |

* cited by examiner

*Primary Examiner*—N. Bhat
(74) *Attorney, Agent, or Firm*—Oliff & Berridge, PLC

(57) ABSTRACT

There is provided a liquid-to-gas contact device comprising: a liquid-to-gas contact medium which is a honeycomb structural body formed of a porous material including a plurality of through channels defined by a plurality of partition walls and extending through the structural body in an axial direction, and including a plurality of flow passages extending through the honeycomb structural body from an outer peripheral surface side and formed isolatedly from the through channels; and a container which includes a gas inlet, a gas outlet, a liquid supply port, a storage tank for liquid, and, if desired, a liquid discharge port and in which the liquid-to-gas contact medium is to be stored. A capillarity phenomenon function possessed by the liquid-to-gas contact medium is used to provide the device which has a superior thermal efficiency and which can be constituted to be simple and compact.

6 Claims, 13 Drawing Sheets

LIQUID-TO-GAS CONTACT DEVICE

TECHNICAL FIELD

The present invention relates to a liquid-to-gas contact device which is usable as a cooling device, extracting device, humidity adjusting device, and the like.

BACKGROUND ART

At present, influences of human daily lives themselves onto environments have raised problems in every field. One of the problems is generation of pollutants caused by incineration of garbage.

For example, an exhaust gas exhausted from municipal waste incinerators contains soot/dust, hydrogen chloride (HCl), $SO_x$, $NO_x$, heavy metals including mercury, or minor constituents such as dioxin, and it is necessary to remove these toxic substances from a viewpoint of environmental protection. Above all, with respect to dioxins (generic term of polychlorinated dibenzo oxine: PCDD and polychlorinated dibenzo furan: PCDF), it has been reported that dioxins are remarkably strong in toxicity and further have carcinogen, and trapping/collecting/removing of dioxins has been taken up as an urgent problem.

However, when the exhaust gas from the incinerator is treated, dioxins cannot be reduced to a desired low concentration in some case.

That is, dioxins generated in a incineration process of garbage are substantially decomposed in a secondary combustion chamber, but the temperature of the incinerator exhaust gas needs to be lowered to a low temperature suitable for dust collection from a high temperature at about 350 to 900° C. in exhaust gas treatment processes such as a heat recovery process, cooling reaction process, and dust collection process. In this case, from a viewpoint of prevention of recomposition of dioxin, it is necessary to quench/pass the gas through a de novo resynthesis temperature region of dioxin (in the vicinity of about 300° C.) in a short time.

When the de novo resynthesis temperature region (300° C.) of dioxin is rapidly cooled to lower the temperature at 150° C. or less, a device is enlarged in gas cooling of a conventional heat exchanger type, and this has been inefficient.

Therefore, vaporization latent heat has been used to perform the cooling by water spray, but a large volume is required, and this has a problem that equipment of the device is also enlarged in size and much running cost is required.

Additionally, a so-called honeycomb structural body is a structural body in which a plurality of cell arrays constituted of a large number of juxtaposed cells are formed. When a ceramic porous body including micro fine pores is used as a base material in addition to a structural material light in weight and high in strength (for an airplane, and the like), a catalyst carrier having a large ventilation volume (for purifying an automobile exhaust gas), and the like, the structural body is also used as a dust collecting filter having a filter area per unit area, or a solid-liquid separation filter. Furthermore, application to a cooling device, extracting device, humidity adjusting device, and the like has also been studied. However, concrete proposals for these devices cannot be said to be complete in practicality in actual situations.

The present invention has been developed in consideration of the problems possessed by the related art, and an object of the present invention is to provide a liquid-to-gas contact device which allows liquid to permeate a plurality of partition walls from an outer peripheral surface side of a honeycomb structural body by a capillarity phenomenon and which uses vaporization latent heat generated at the time of contact of a gas with the liquid and which can accordingly be superior in thermal efficiency, simple, and compact.

DISCLOSURE OF THE INVENTION

The present invention relates to a liquid-to-gas contact device comprising: a gas supply section; and a liquid supply section, characterized in that a honeycomb structural body formed of a porous material is used as a liquid-to-gas contact medium.

Moreover, the present invention relates to a method of using the liquid-to-gas contact device. Firstly, there is provided the use as a cooling device, that is, a gas cooling method comprising the steps of: using a liquid-to-gas contact device comprising a liquid-to-gas contact medium which is a honeycomb structural body formed of a porous material including a plurality of through channels defined by a plurality of partition walls and extending through the structural body in an axial direction, and including a plurality of flow passages extending the honeycomb structural body from an outer peripheral surface side and formed isolatedly from the through channels, and a container including a gas inlet, a gas outlet, a liquid supply port, a liquid storage tank, and, if desired, a liquid discharge port for storing the liquid-to-gas contact medium; passing a gas (including a gas body) through the plurality of through channels which are defined and formed by the plurality of partition walls of the liquid-to-gas contact medium and which extend through the axial direction of the honeycomb structural body; passing a liquid through the flow passages which extend from the outer peripheral surface side of the honeycomb structural body and which are formed isolatedly from the through channels; allowing the liquid to permeate the partition walls on the side of the through channels with a capillarity phenomenon to bring the gas into contact with the liquid; allowing the liquid to permeate the partition walls on the side of the through channels by a capillarity phenomenon to bring the gas into contact with the liquid; and cooling the gas by a vaporization latent heat generated at the time of the contact of the gas with the liquid.

Secondly, there is provided the use as an extracting device, that is, a method of condensing a solution, comprising the steps of: using a liquid-to-gas contact device comprising a liquid-to-gas contact medium which is a honeycomb structural body formed of a porous material including a plurality of through channels defined by a plurality of partition walls and extending through the structural body in an axial direction, and including a plurality of flow passages extending through the honeycomb structural body from an outer peripheral surface side and formed isolatedly from the through channels, and a container including a gas inlet, a gas outlet, a liquid supply port, a liquid storage tank, and, if desired, a liquid discharge port for storing the liquid-to-gas contact medium; passing a gas (including a gas body) through the plurality of through channels which are defined and formed by the plurality of partition walls of the liquid-to-gas contact medium and which extend through the axial direction of the honeycomb structural body; passing a liquid through the flow passages which extend from the outer peripheral surface side of the honeycomb structural body and which are formed isolatedly from the through channels; allowing the liquid to permeate the partition walls on the side of the through channels with a capillarity phenomenon to bring the gas into contact with the liquid; allowing the liquid to permeate the partition walls on the side of the through channels by a capillarity phenomenon to bring the gas into contact with the liquid; and evaporating a solvent with a vaporization latent heat generated at the time of the contact of the gas with the solution to condensate the solution in the flow passages.

Thirdly, there is provided the use as a humidity adjusting device, that is, a humidification method comprising the steps of: using a liquid-to-gas contact device comprising a liquid-to-gas contact medium which is a honeycomb structural body formed of a porous material including a plurality of through channels defined by a plurality of partition walls and extending through the structural body in an axial direction, and including a plurality of flow passages extending through the honeycomb structural body from an outer peripheral surface side and formed isolatedly from the through channels, and a container including a gas inlet, a gas outlet, a liquid supply port, a liquid storage tank, and, if desired, a liquid discharge port for storing the liquid-to-gas contact medium; passing a gas such as air through the plurality of through channels which are defined and formed by the plurality of partition walls of the liquid-to-gas contact medium and which extend through the axial direction of the honeycomb structural body; passing a liquid such as tap water through the flow passages which extend from the outer peripheral surface side of the honeycomb structural body and which are formed isolatedly from the through channels; allowing the tap water to permeate the partition walls on the side of the through channels with a capillarity phenomenon to bring the air into contact with the tap water; allowing the tap water to permeate the partition walls on the side of the through channels by a capillarity phenomenon to bring the air into contact with the tap water; evaporating the tap water by a vaporization latent heat generated at the time of the contact of the air with the tap water; and allowing the air to contain water vapor.

BRIEF DESCRIPTION OF THE DRAWINGS

FIG. 1(a) is a schematic sectional view.

FIG. 2(a) is a schematic sectional view.

FIG. 3(a) is a schematic sectional view.

FIG. 4(a) is a schematic sectional view.

FIG. 5(a) is a schematic sectional view.

FIG. 6(a) is a schematic sectional view.

FIG. 7(a) is a schematic sectional view.

FIG. 8(a) is a schematic sectional view.

FIG. 9(a) is a schematic sectional view.

BEST MODE FOR CARRYING OUT THE INVENTION

Figure 1A:
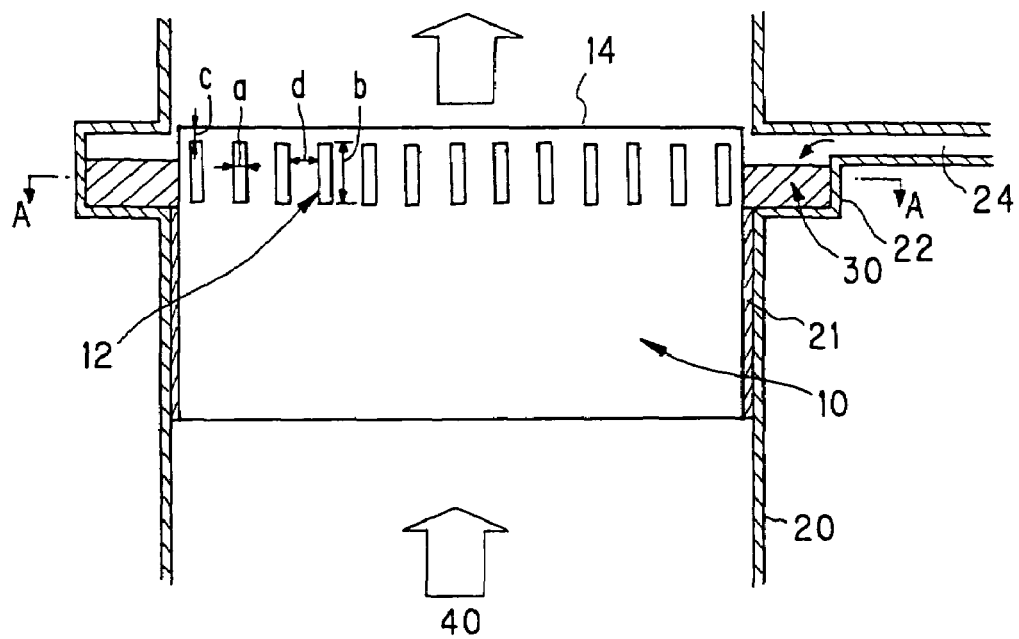
FIGS. 1(a) and (b) show one example of a liquid-to-gas contact device of the present invention.

A liquid-to-gas contact device of the present invention includes a liquid-to-gas contact medium, and a container for storing the liquid-to-gas contact medium including a gas inlet, a gas outlet, a liquid supply port, a liquid storage tank, and, if desired, a liquid discharge port.

Therefore, in accordance with the present invention, the liquid permeates a plurality of partition walls from an outer peripheral surface side of a honeycomb structural body which is the liquid-to-gas contact medium by a capillarity phenomenon, a vaporization latent heat generated at the time of contact of the gas with the liquid is used to fulfill a desired function, and accordingly there is provided the liquid-to-gas contact device which is superior in thermal efficiency, simple, and compact.

The liquid-to-gas contact medium in the present invention is a liquid-to-gas contact medium constituted of a porous material in which a plurality of through channels defined by a plurality of partition walls and extending through the structural body in an axial direction are formed. Moreover, the contact medium allows the liquid to permeate the plurality of partition walls from the outer peripheral surface side of the honeycomb structural body and passes the gas through the through channels and brings the liquid into contact with the gas in the vicinity of the partition walls to fulfill a desired function.

For the container in which the liquid-to-gas contact medium is stored, as long as strength is secured in accordance with application, the material is not limited, but a container formed of a metal or a resin is usually preferably used. The gas inlet and gas outlet are disposed in the container. When a hollow container such as a cylindrical container is used as the container, either one opening may be used as the gas inlet, and the other opening may be used as the gas outlet.

The liquid supply port, the liquid storage tank, and, if desired, the liquid discharge port may be disposed in appropriate portions in accordance with the application of the device, and in this case, there is not any special limitation.

It is to be noted that the liquid-to-gas contact medium in the present invention is formed of a ceramic. Therefore, when the medium is stored in the container, a cushion material is preferably used. As this cushion material, ceramic fiber, and the like are preferably used.

As long as flow passages 12 in the liquid-to-gas contact medium of the present invention have a function capable of allowing the liquid to contact the gas in the liquid-to-gas contact medium in accordance with a use purpose, especially a shape, structure, and the like are not limited. Details of a shape, size, arrangement position, and the like which have to be usually possessed by the liquid-to-gas contact medium will be described later. For example, for a honeycomb structural body 10 including a plurality of through channels which are defined by a plurality of partition walls and which extend through the honeycomb structural body in the axial direction, hole portions are made to a specific depth at a specific interval so as to extend through an outer peripheral portion from through channel openings. Thereafter, an opening end of the flow passage 12 is clogged with a clogging portion to a predetermined thickness from at least one terminal end of the honeycomb structural body 10 to form the flow passage.

An embodiment of the present invention will hereinafter be described in detail with reference to the drawings.

Figure 2A:
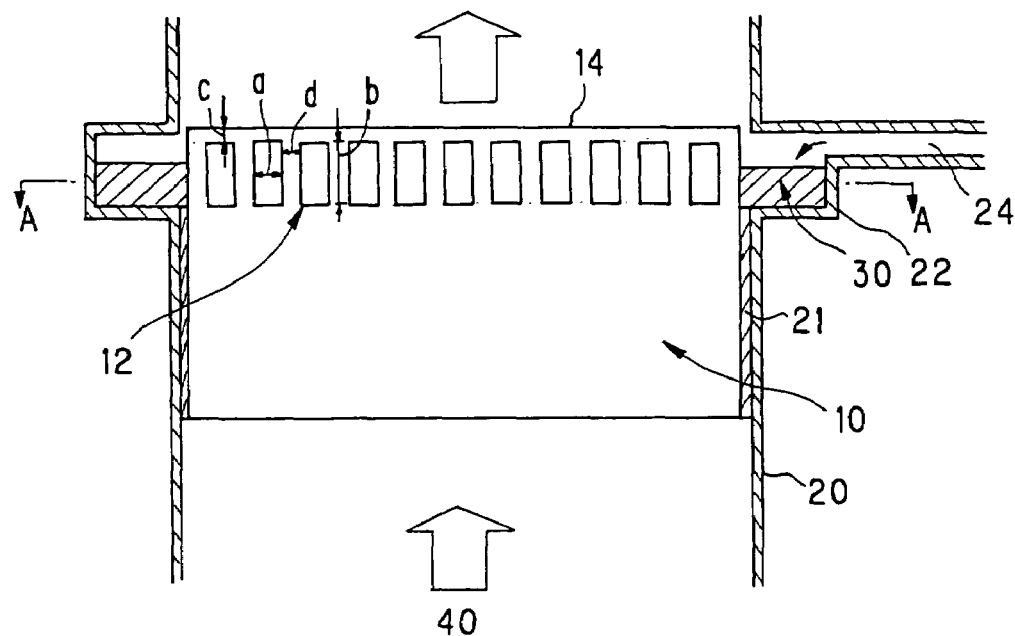
FIGS. 2(a) and (b) show another example of the liquid-to-gas contact device of the present invention.

In the liquid-to-gas contact device of the present invention, for example, as shown in FIGS. 1(a) and (b) and FIGS. 2(a) and (b), the liquid-to-gas contact medium 10 is the honeycomb structural body 10 formed of a porous material, and include a plurality of through channels (cells) 14 which are defined by a plurality of partition walls and which are formed extending through the structural body in the axial direction, and the flow passages 12 which extend through from the outer peripheral surface side of the honeycomb structural body 10 and which are formed isolatedly from the through channels 14.

In the liquid-to-gas contact device of the present invention shown in these figures, a gas 40 is passed through the through channels (cells) 14, a liquid 30 is passed through the flow passages 12, the gas 40 is accordingly allowed to contact the liquid 30 in the vicinity of the partition walls, the liquid 30 is allowed to permeate the partition walls on the flow passages 12 side by the capillarity phenomenon, and vaporization of the liquid by the contact of the gas 40 with the liquid 30 is used.

Here, main characteristics of the liquid-to-gas contact device of the present invention lie in that a contact area with the gas can be enlarged by the use of the honeycomb structural body, the honeycomb structural body is formed of the porous material having a minute pore diameter, and therefore the capillarity phenomenon can be used to vaporize the liquid with very high efficiency.

For example, the liquid-to-gas contact device shown in FIGS. 1(a) and (b) and FIGS. 2(a) and (b) is constituted of the honeycomb structural body 10 in which the flow passages 12 are disposed, a metal container 20 including a storage tank 22 in which the honeycomb structural body 10 is stored to form a gas flow passage and which supplies the liquid 30 to the flow passages 12, and a liquid supply tube 24 for supplying the liquid 30 to the storage tank 22. Here, it is important to position and dispose at least either one end of the flow passage 12 in a position where a height of the liquid 30 stored in the storage tank for the liquid 22 is sufficiently covered with the height of the flow passage 12 in a flow direction of a gas flow, so that the liquid can efficiently flow into the flow passages 12.

In the above-described liquid-to-gas contact device, the liquid can be evaporated with the vaporization latent heat generated at the time of the contact of the gas with the liquid with very high efficiency, and therefore the device can preferably be used as a cooling device for cooling gas or a humidity adjusting device for imparting liquid vapor to the gas. Moreover, the device can also preferably be used as a vaporizer for vaporizing combustible liquid with good efficiency to generate a combustible mixture gas.

Figure 3A:
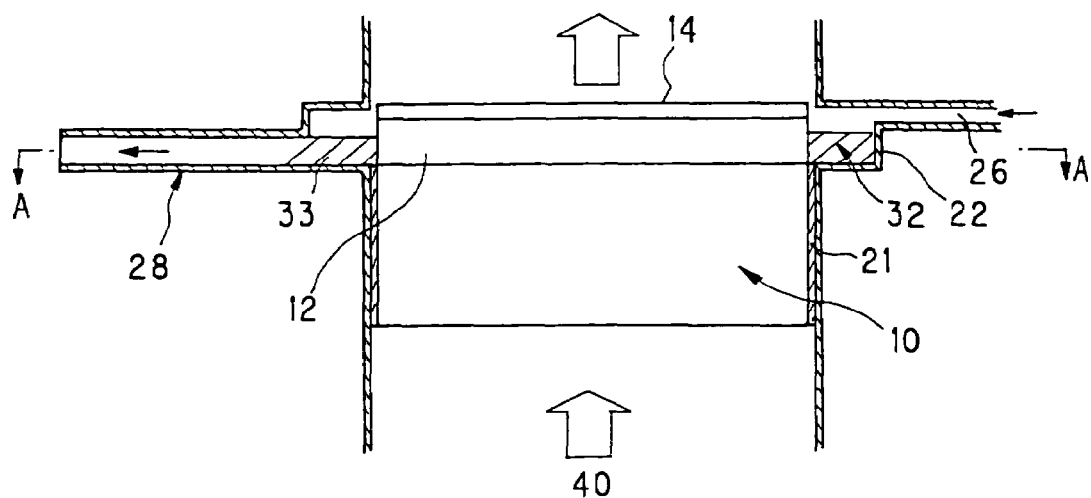
FIGS. 3(a) and (b) show further example of the liquid-to-gas contact device of the present invention.

Moreover, the liquid-to-gas contact device shown in FIGS. 3(a) and (b) is constituted: of the honeycomb structural body 10 in which the flow passages 12 are disposed; the metal case 20 including the storage tank 22 in which the honeycomb structural body 10 is stored to form the gas flow passage and which supplies a solution 32 to the flow passages 12; a solution supply tube 26 for supplying the solution 32 to the storage tank 22; and a solution recovery tube 28 for recovering a concentrated solution 33 from the storage tank 22.

Since the solvent in the solution 32 can be evaporated by the vaporization latent heat generated at the time of the contact of the gas 40 with the solution 32 very highly efficiently, the above-described liquid-to-gas contact device can preferably be used as an extracting device for condensing the solution 32 in fields of food industry and chemical industry.

Figure 4A:
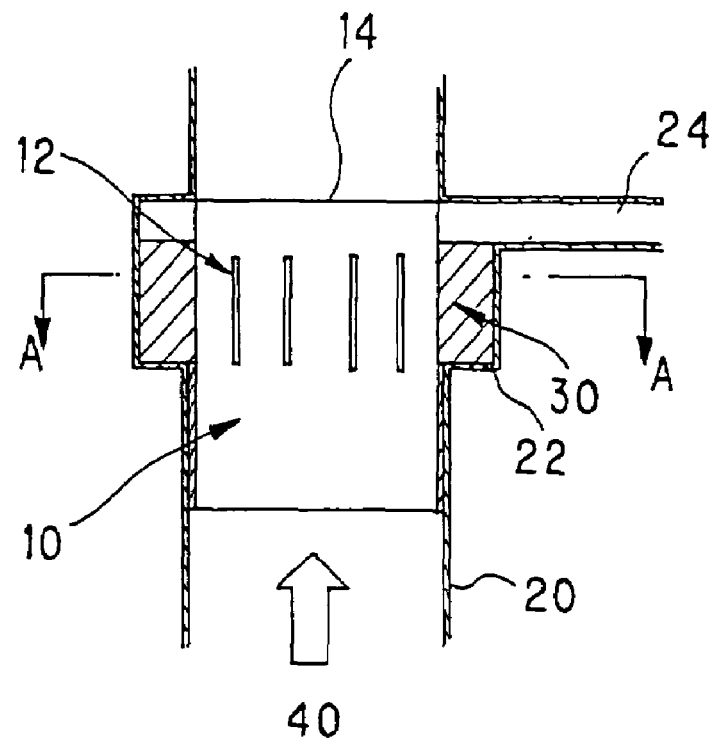
FIGS. 4(a) and (b) show another example (1) of the liquid-to-gas contact device of the present invention.
Figure 4B:
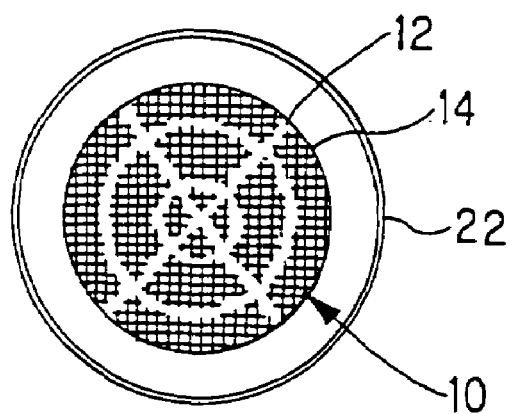
FIG. 4(b) is an A-A sectional view of FIG. 4(a)
Figure 5A:
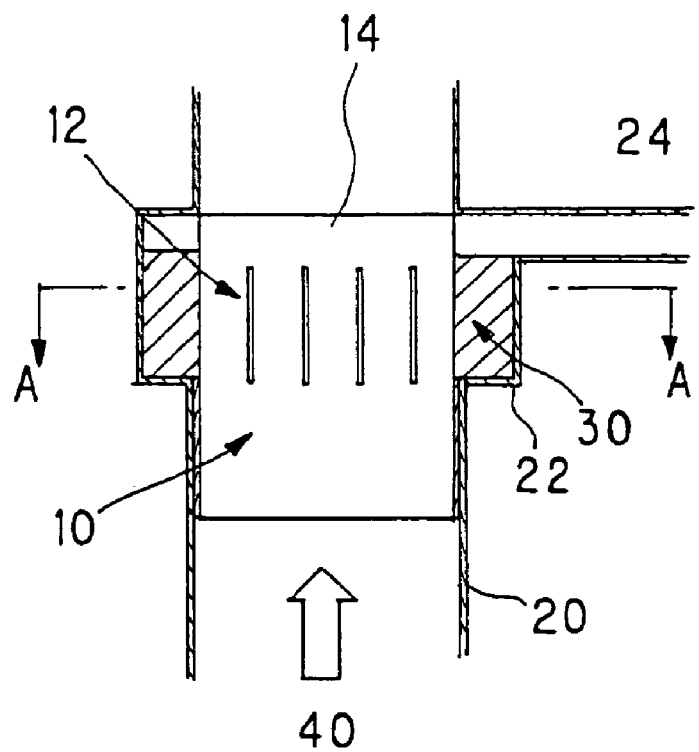
FIGS. 5(a) and (b) show another example (2) of the liquid-to-gas contact device of the present invention.
Figure 5B:
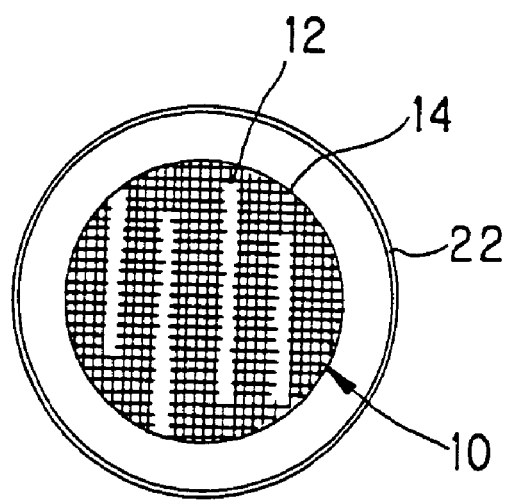
FIG. 5(b) is an A-A sectional view of FIG. 5(a)

It is to be noted that the configuration of the flow passages 12 in the cell opening surface of the honeycomb structural body 10 is not limited to the configuration shown in FIGS. 1(a) and (b), FIGS. 2(a) and (b), and FIGS. 3(a) and (b), and a combined shape of a concentric circle and cross shown in FIG. 4(b) may also be used. A zigzag shape in which opening positions are alternately disposed in a side surface as shown in FIG. 5(b), or a configuration in which curb shapes are appropriately selected or combined may also be used.

Figure 8A:
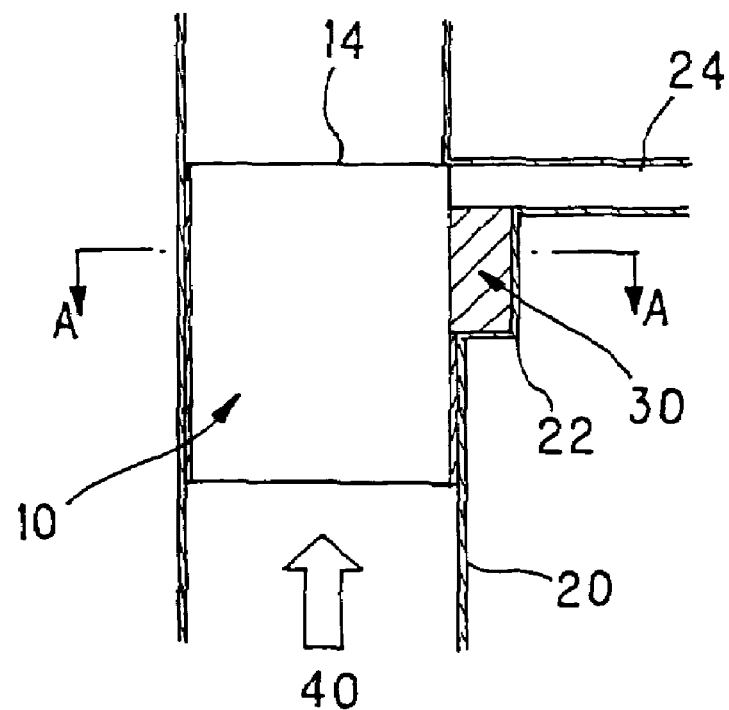
FIGS. 8(a) and (b) show another example (5) of the liquid-to-gas contact device of the present invention.
Figure 8B:
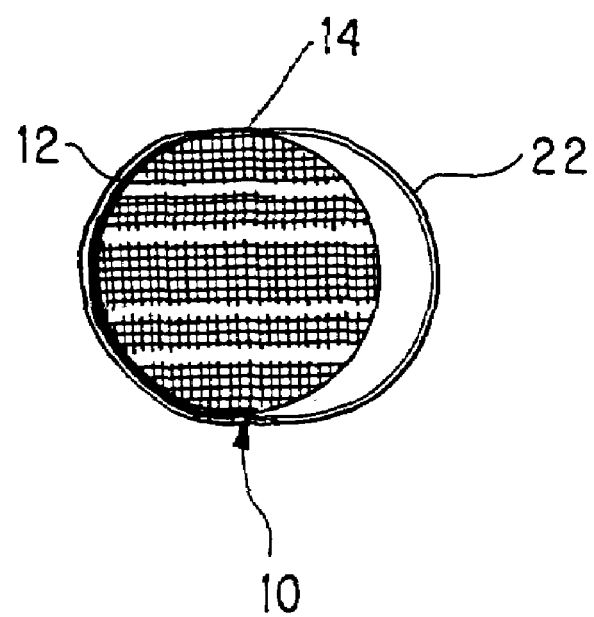
FIG. 8(b) is an A-A sectional view of FIG. 8(a)

FIGS. 8(a) and (b) show an example in which the flow passage is formed in a permeation direction of the liquid. As shown in these figures, in order to efficiently and easily supply a fluid into the flow passages 12, it is preferable to optimize the shapes/arrangement of the flow passages 12 in the cell opening surface in accordance with the shape of the storage tank for the liquid 22 for supplying the liquid to the honeycomb structural body 10.

Moreover, needless to say, the positions of the flow passages 12 disposed in the honeycomb structural body 10 for use as the above-described liquid-to-gas contact medium, especially a distance from the cell opening surface and a sectional shape shown by c in FIGS. 1(a) and 2(a), a shape and a sectional area shown in FIGS. 1(a) and 2(a), that is, an area given by width a of the flow passage×length b of the flow passage in FIGS. 1(a) and 2(a), and an interval between the flow passages, that is, d in FIGS. 1(a) and 2(a) are determined by the material, porosity, and average pore diameter of the honeycomb structural body for use as the liquid-to-gas contact medium, and are preferably appropriately determined in consideration of the relation with the application of the liquid-to-gas contact device, especially evaporation properties.

Figure 7A:
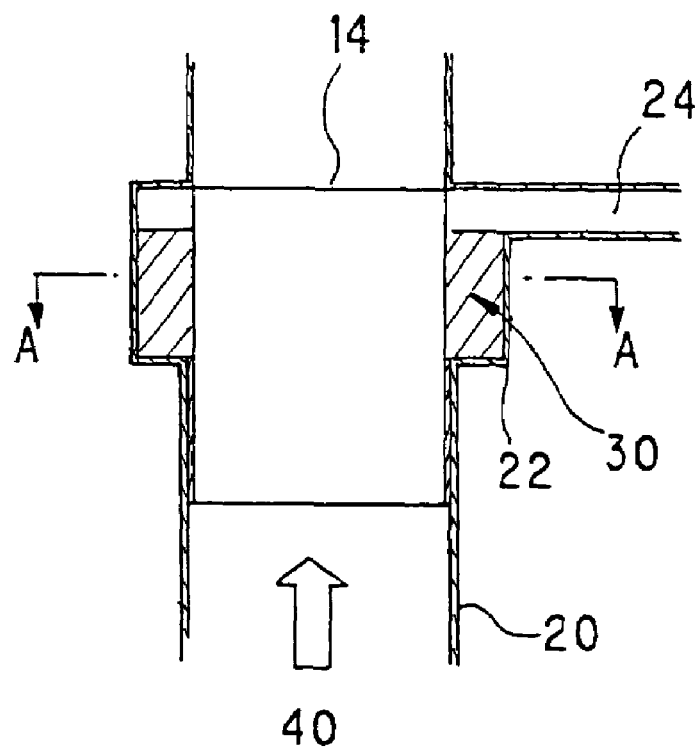
FIGS. 7(a) and (b) show another example (4) of the liquid-to-gas contact device of the present invention.

Therefore, when micro hole portions in the partition walls sufficiently function as the flow passages depending on the application of the liquid-to-gas contact device or the honeycomb structural body for use, as shown in FIGS. 7(a) and (b), the honeycomb structural body 10 can be used without disposing especially separate flow passages. Needless to say, considering that the function can be fulfilled regardless of the use purpose, operation conditions, and the like, it is preferable to dispose a plurality of separate flow passages.

With the honeycomb structural body for use as the liquid-to-gas contact medium in the present invention, optimum shape, size, cell shape, cell hole diameter, cell interval (cell wall thickness), and the like may be selected in the relation with the application of the liquid-to-gas contact device, and are not especially limited as long as the conditions are satisfied.

It is to be noted that an interval d between the flow passages 12 preferably satisfies the following conditions in the relation with a gas flow rate Q (Nm³/min) per a volume of 1 l of the honeycomb structural body:

$$(d) < 20 \times (\alpha/Q) [mm]$$

Figure 9A:
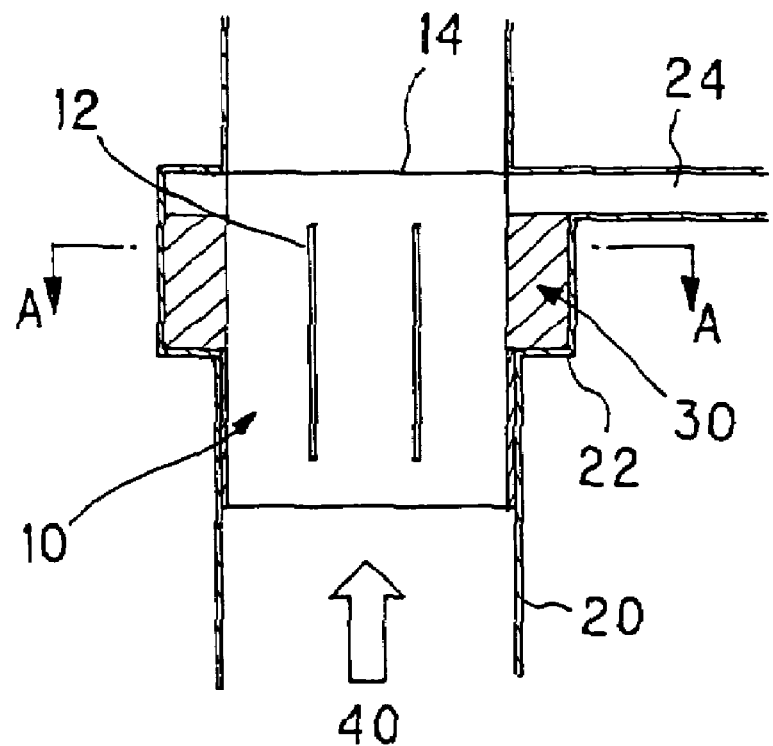
FIGS. 9(a) and (b) show another example (6) of the liquid-to-gas contact device of the present invention.

For example, as the sectional shape of the honeycomb structural body for use as the liquid-to-gas contact medium in the present invention, a circle (see FIGS. 1(a) (b) to FIGS. 8(a) (b)), a square (see FIGS. 9(a) (b)), a rectangle, or a hexagon can be used in the cylindrical body. For the shape of each cell, various shapes such as the circle, triangle, quadrangle, pentangle, and hexagon can also be used.

The honeycomb structural body for use as the liquid-to-gas contact medium in the present invention may usually appropriately be selected from structural bodies having a rib (partition wall) thickness of 1.5 to 32 mil (0.0375 to 0.8 mm) and a cell density of 10 to 1200 cpsi (about 1.6 cells to 186 cells/cm²) in consideration of the application.

Moreover, the honeycomb structural body for use as the liquid-to-gas contact medium in the present invention may appropriately be selected from those having a porosity of 10 to 70% and an average pore diameter of 5 to 100 μm in consideration of the application.

Furthermore, the material of the honeycomb structural body for use as the liquid-to-gas contact medium in the present invention is not especially limited as long as the material is porous, but at least one porous material selected from a group consisting of cordierite, alumina, mullite, SiC, and silicon nitride is preferable, and the material is preferably selected in consideration of the application.

The present invention will hereinafter be described based on examples in more detail, but the present invention is not limited to these examples.

EXAMPLE 1

(Liquid-to-gas Contact Device: Cooling of Combustion Exhaust Gas)

In a honeycomb structural body (diameter of 118 mm, length of 60 mm) formed of cordierite having a porosity of 35% and an average pore diameter of 10 μm and including a ell structure with a rib thickness of 80 μm and a cell density of 62 cells/cm², 13 flow passages 12 each having a width (a) of 1.3 mm (for one cell), a height (b) of 15 mm and each having a rectangular sectional shape vertically long in an axial direction were made at an interval (d) of 5 mm so as to extend through an outer peripheral portion from a through channel opening of the honeycomb structural body 10. Thereafter, the open end of each flow passage 12 was clogged with a clogging member with a thickness (c) of 10 mm from the terminal end of the honeycomb structural body 10 [see FIGS. 1(a) and (b)].

Figure 10:
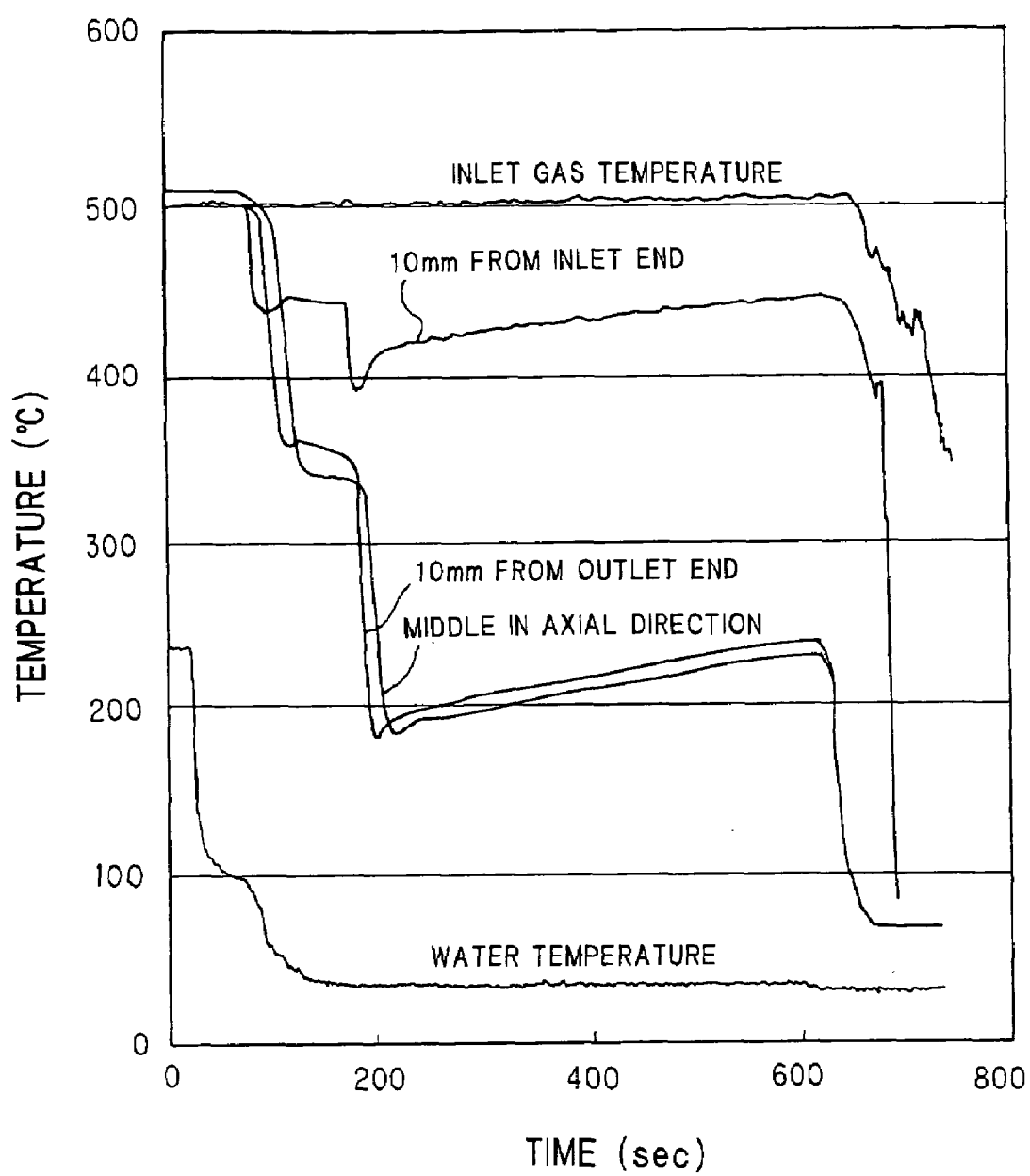
FIG. 10 is a graph showing a relation of temperature of combustion exhaust gas with respect to an elapsed water supply time in Example 1.

As shown in FIGS. 1(a) and (b), the honeycomb structural body 10 was stored in the cylindrical metal container 20 via a mat 21 also serving as a seal, and the water 30 was started to flow into the flow passages 12 from the storage tank 22 attached to the metal container 20. Thereafter, a combustion exhaust gas of propane gas (gas temperature of 500° C.) was passed toward an upper gas exhaust port disposed in the container from a lower gas supply port of the metal container 20 at a flow rate of 0.7 Nm³/min, and the water 30 was supplied from the water supply tube 24 at a flow rate of 180 cc/min. Results are shown in FIG. 10.

EXAMPLES 2 and 3

(Liquid-to-gas Contact Device: Cooling of Combustion Exhaust Gas)

In the honeycomb structural body (diameter of 118 mm, length of 60 mm) formed of cordierite having a porosity of 35% and an average pore diameter of 10 μm and including a ell structure with a rib thickness of 80 μm and a cell density of 62 cells/cm², 11 flow passages 12 each having a width (a) of 3.8 mm (for three cells), a height (b) of 15 mm and each having a rectangular sectional shape vertically long in the axial direction were made at an interval (d) of 4.6 mm so as to extend through the outer peripheral portion from the through channel opening of the honeycomb structural body 10. Thereafter, the open end of each flow passage 12 was clogged with the clogging member with a thickness (c) of 10 mm from the terminal end of the honeycomb structural body 10 [see FIGS. 2(a) and (b)].

Figure 11:
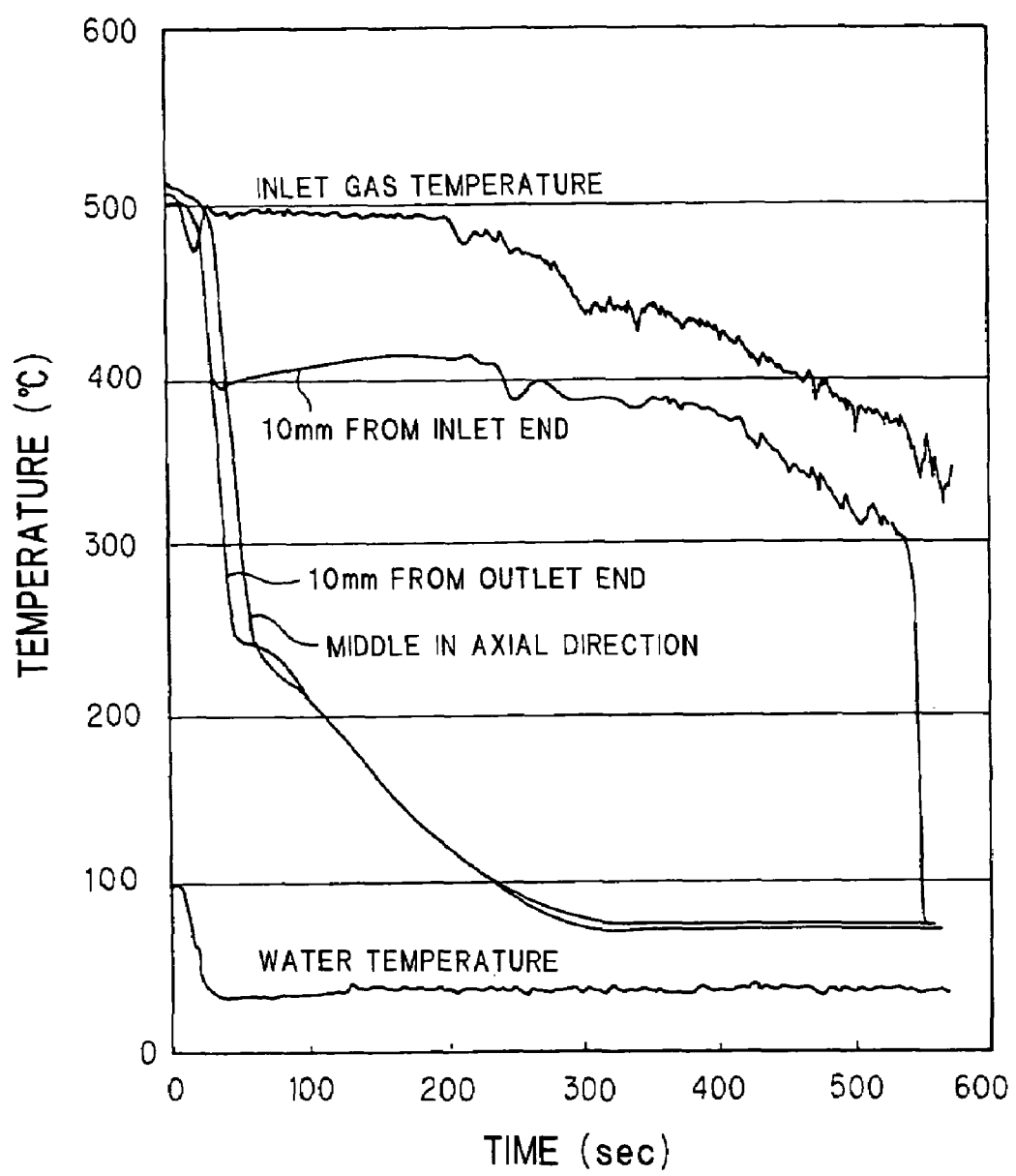
FIG. 11 is a graph showing the relation of the temperature of the combustion exhaust gas with respect to the elapsed water supply time in Example 2.

As shown in FIGS. 2(a) and (b), the honeycomb structural body 10 was stored in the cylindrical metal container 20 via the mat 21 also serving as the seal, and the water 30 was started to flow into the flow passages 12 from the storage tank 22 attached to the metal container 20. Thereafter, the combustion exhaust gas of propane gas (gas temperature of 500° C.) was passed toward the upper gas exhaust port disposed in the container from the lower gas supply port of the metal container 20 at a flow rate of 0.7 Nm³/min, and the water 30 was supplied from the water supply tube 24 at a flow rate of 180 cc/min (Example 2). Results are shown in FIG. 11.

Moreover, as shown in FIGS. 2(a) and (b), the honeycomb structural body 10 was stored in the cylindrical metal container 20 via the mat 21 also serving as the seal, and the water 30 was started to flow into the flow passages 12 from the storage tank 22 attached to the metal container 20. Thereafter, the combustion exhaust gas of propane gas (gas temperature of 500° C.) was passed toward the upper gas exhaust port in the container from the lower gas supply port of the metal container 20 at a flow rate of 0.7 Nm³/min, and the water 30 was supplied from the water supply tube 24 at a flow rate of 260 cc/min (Example 3).

CONSIDERATIONS: EXAMPLES 1 TO 3

In Example 1, as shown in FIG. 10, an outlet gas temperature was 200° C., and it was possible to lower a gas temperature by 300° C. at the time when a combustion gas temperature was steady (180 sec).

Moreover, in Example 2, a flow passage volume was set to be larger than that of Example 1, and therefore as shown in FIG. 11, the outlet gas temperature was 130° C., and it was possible to lower the temperature of the combustion exhaust gas by 370° C. at the time when the temperature of the combustion exhaust gas was steady (180 sec).

Furthermore, in Example 3, a water supply amount was increased to 260 cc/min on the same conditions as those of Example 2. Accordingly, the outlet gas temperature was 70° C., and it was possible to lower the temperature of the combustion exhaust gas by 430° C. at the time when the temperature of the combustion exhaust gas was steady (180 sec).

Figure 12:
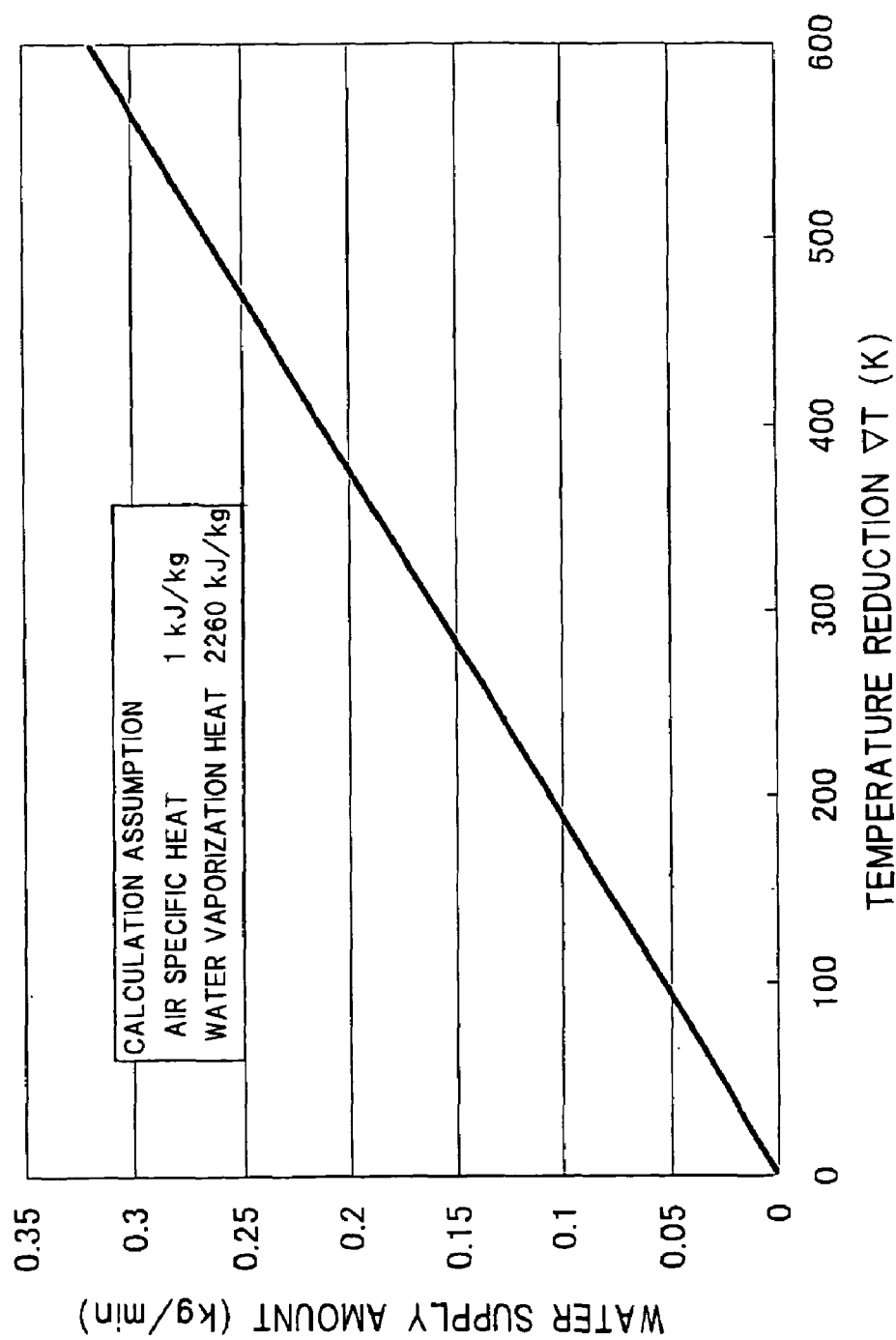
FIG. 12 is a graph showing a relation between water supply amount (kg/min) and temperature reduction $\Delta T(K)$ in the example.

At this time, it was confirmed that the water supply amount (kg/min) had a proportional relation with respect to a temperature reduction ΔT(K) as shown in FIG. 12. (Example 4: Optimization of Flow Passages of Honeycomb Structural Body for Use in Liquid-to-gas Contact Device)

The honeycomb structural body having the same cell structure (12 mil [about 0.3 mm], 200 cpsi) and a size of φ20 mm×50 mm was assumed as a standard sample shape, and 3.5 cc of water in a depth of 5 mm in Schale with φ30 mm was prepared. A water absorbing property was evaluated with a time required for taking up the water, when the honeycomb sample was vertically disposed in the water.

Figure 13:
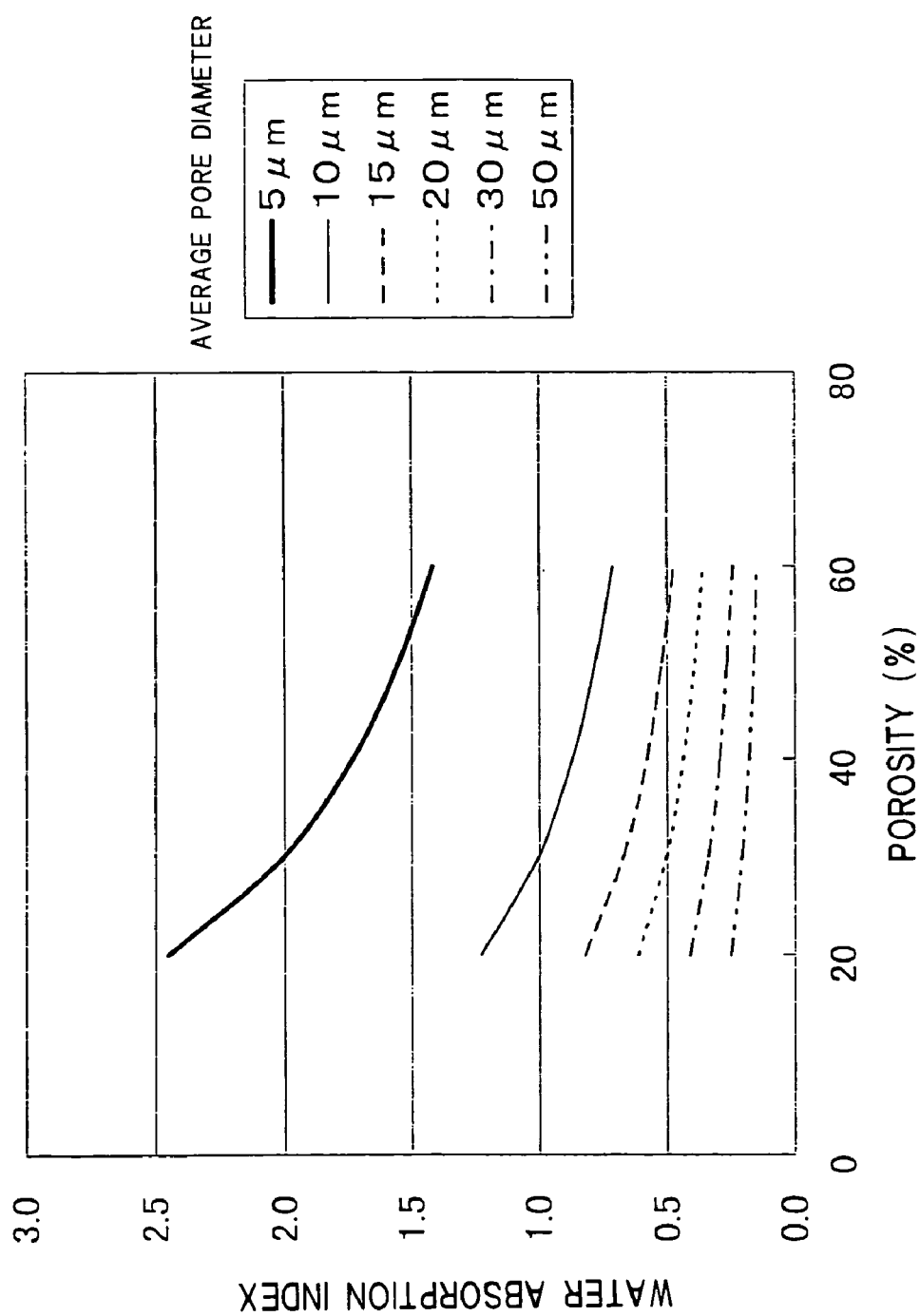
FIG. 13 is a graph showing a relation between water absorbing property (water absorbing index) and porosity in an average pore diameter of a honeycomb structural body.

Cordierite having a porosity of 30% and average pore diameter of 10 μm was used as a base to calculate water absorption index α. A relation between the water absorption index α and the porosity is shown in FIG. 13.

Figure 1B:
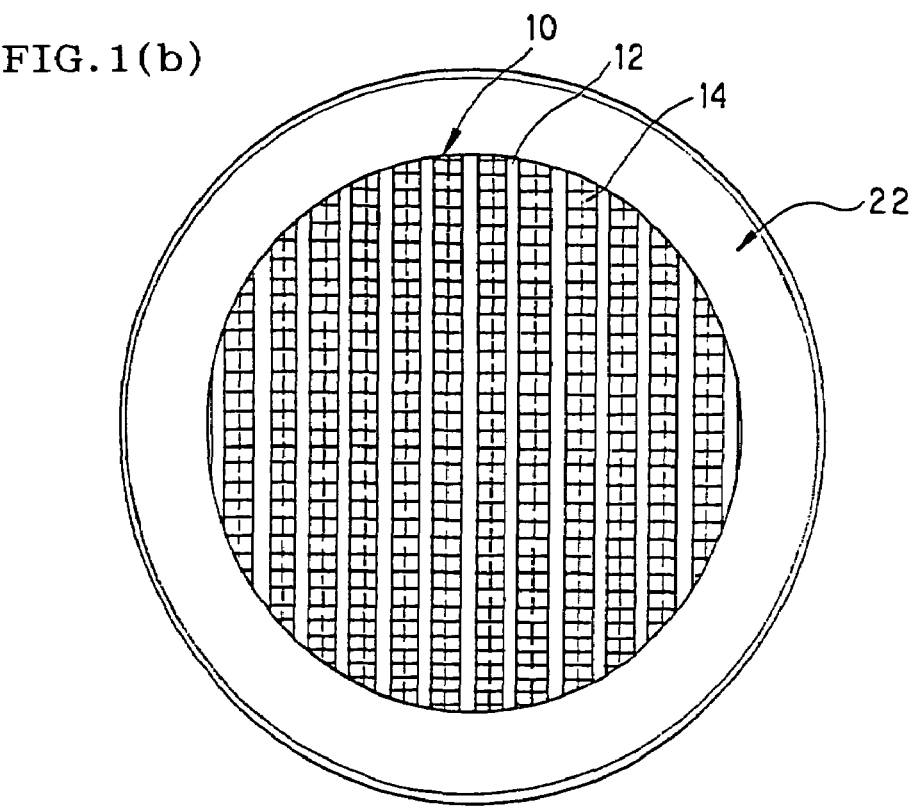
FIG. 1(b) is an A-A sectional view of FIG. 1(a)
Figure 2B:
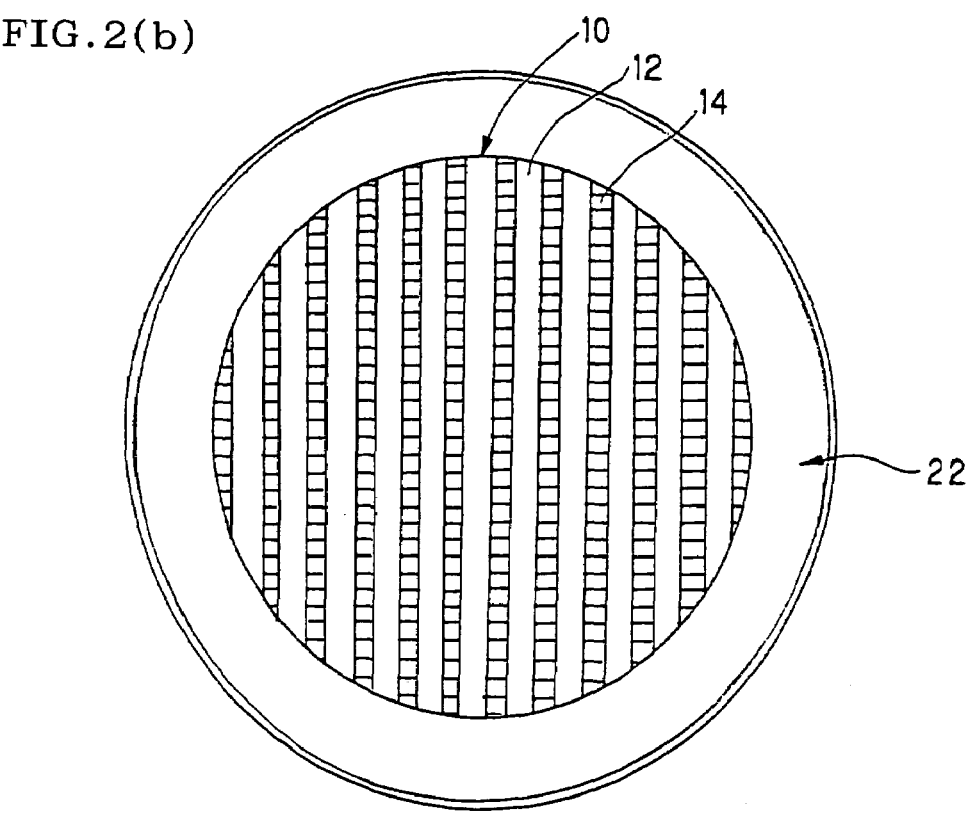
FIG. 2(b) is an A-A sectional view of FIG. 2(a)
Figure 3B:
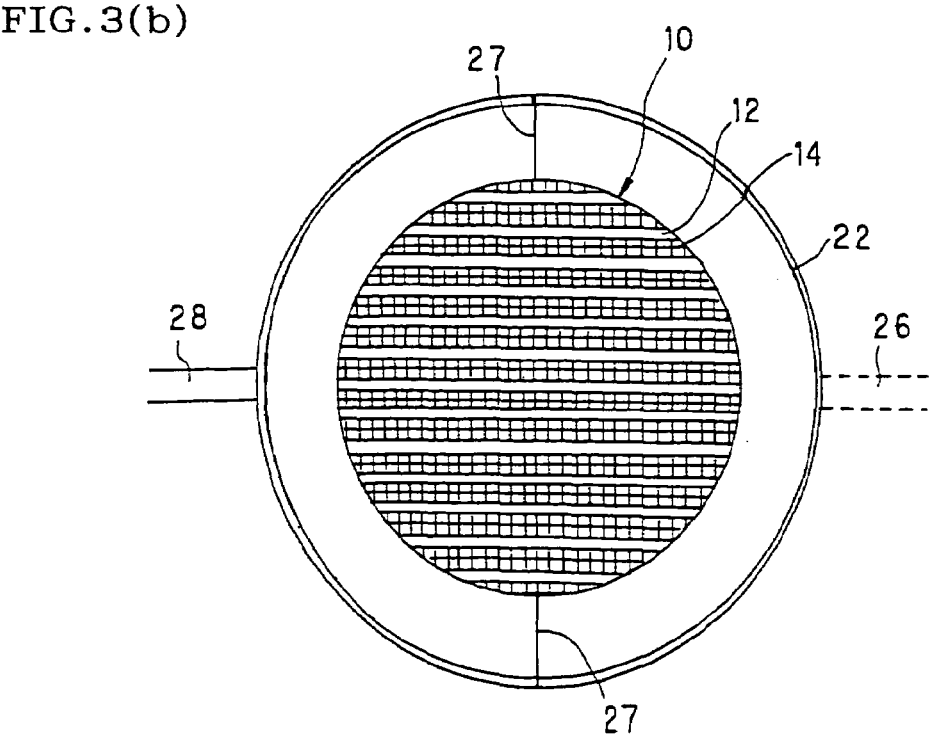
FIG. 3(b) is an A-A sectional view of FIG. 3(a)
Figure 6A:
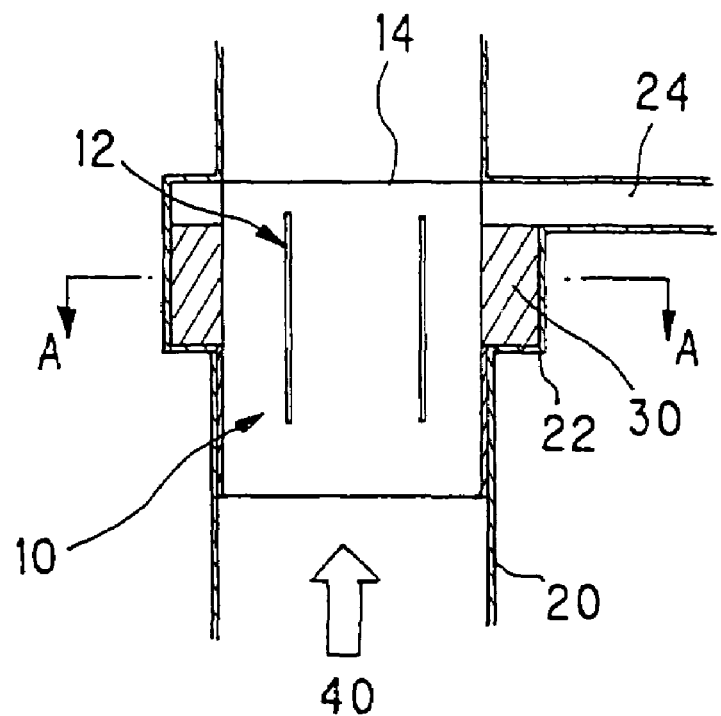
FIGS. 6(a) and (b) show another example (3) of the liquid-to-gas contact device of the present invention.
Figure 6B:
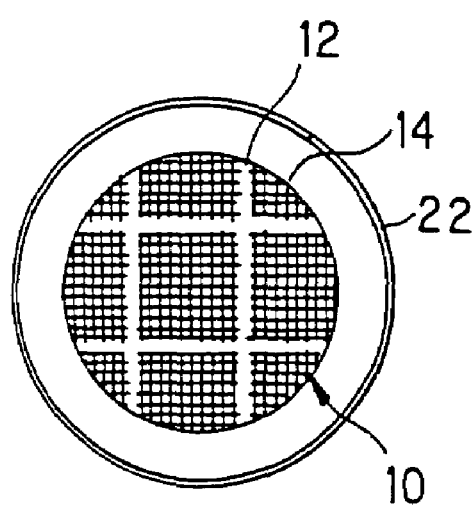
FIG. 6(b) is an A-A sectional view of FIG. 6(a)
Figure 7B:
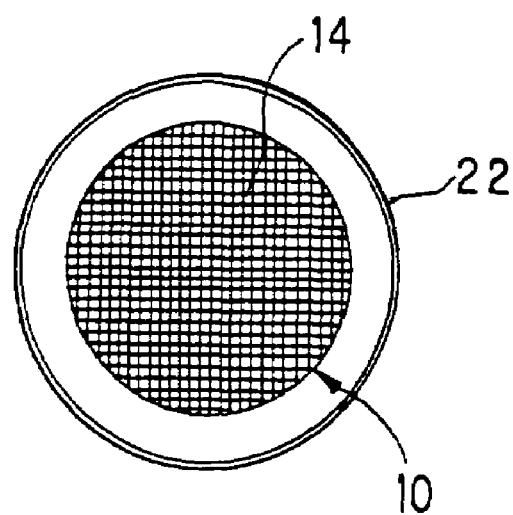
FIG. 7(b) is an A-A sectional view of FIG. 7(a)
Figure 9B:
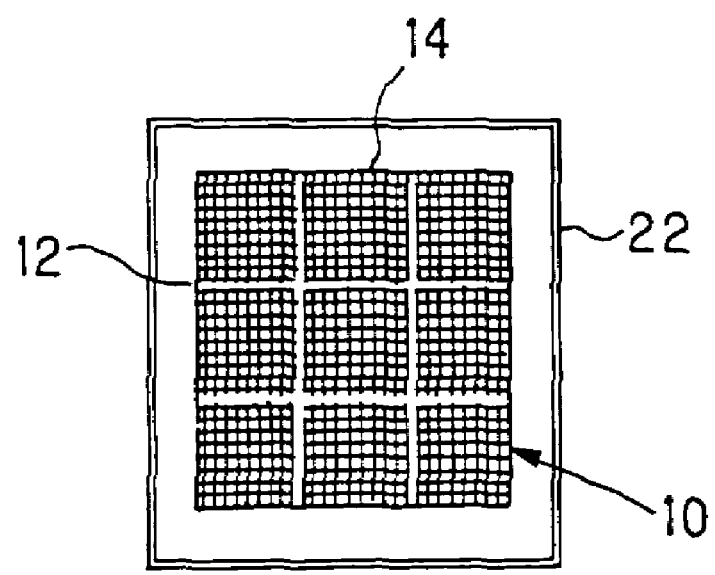
FIG. 9(b) is an A-A sectional view of FIG. 9(a)

It has been found that when different materials are used in accordance with the water absorption index α, it is important to appropriately adjust the interval d of the flow passages 12 of the honeycomb structural body 10 shown in FIGS. 1(*a*) and (*b*), FIGS. 2(*a*) and (*b*), FIGS. 3(*a*) and (*b*), FIGS. 4(*a*) and (*b*), FIGS. 5(*a*) and (*b*), FIGS. 6(*a*) and (*b*), FIGS. 7(*a*) and (*b*), FIGS. 6(*a*) and (*b*), and FIGS. 9(*a*) and (*b*) as in the following equation, in order to fulfill a capability of the liquid-to-gas contact device.

For the gas flow rate Q (Nm$^3$/min) per the volume 1 l of the honeycomb structural body, (Interval d of the flow passages)<20×(α/Q) [mm]

INDUSTRIAL APPLICABILITYI

A liquid-to-gas contact device of the present invention can preferably be used in a cooling device, solution condensing device, extracting device, humidity adjusting device, and combustible liquid vaporizer.

Especially in the liquid-to-gas contact device of the present invention, a liquid is allowed to permeate a plurality of partition walls from an outer peripheral surface side of a honeycomb structural body by a capillarity phenomenon, contact opportunities between gas and liquid are largely increased, and therefore the device can be superior in thermal efficiency, and simple and compact.

Moreover, with the use as the cooling device, vaporization latent heat of the liquid can be used in the simple and compact structure, and therefore the device is superior in installation property and economical efficiency.

The invention claimed is:

1. A liquid-to-gas contact device comprising: a liquid-to-gas contact medium; a gas inlet; a gas outlet; a liquid supply port; a tank for liquid; and a container for the liquid-to-gas contact medium; wherein:

the liquid-to-gas contact medium is constituted of a honeycomb structural body, the honeycomb structural body including a plurality of gas flow passages in the form of a plurality of through channels defined by a plurality of partition walls and extending through the honeycomb structural body in an axial direction, and a plurality of liquid flow passages formed to extend through the honeycomb structural body from an outer peripheral surface side of the honeycomb structural body;

the tank for the liquid is formed as a part of the container, and is constituted in such a manner that the outer peripheral surface of the honeycomb structural body forms an inner peripheral surface of the tank for the liquid when the liquid-to-gas contact medium is disposed in the container; and the plurality of partition walls comprise unidirectionally permeable structures that prevent gas in the gas flow passages from entering into the liquid flow passages, but allow liquid in the liquid flow passages to permeate into the gas flow passages by capillary action.

2. The liquid-to-gas contact device according to claim 1, wherein at least one end of the plurality of flow passages for the liquid has an opening with a height extending in a gas flow direction, the liquid-to-gas contact medium is disposed in such a maimer that a height of the liquid stored in the storage tank for the liquid is aligned with the height of the opening and sufficiently covered by the opening.

3. A device for cooling a gas, comprising: the liquid-to-gas contact device according to claim 1.

4. A device for condensing a solution, comprising: the liquid-to-gas contact device according to claim 1.

5. A humidifying device, comprising: the liquid-to-gas contact device according to claim 1.

6. A liquid-to-gas contact device comprising: a liquid-to-gas contact medium; a gas inlet; a gas outlet; a liquid supply port; a tank for liquid; and a container for the liquid-to-gas contact medium, wherein:

the liquid-to-gas contact medium is constituted of a honeycomb structural body, the honeycomb structural body including a plurality of gas flow passages in the form of a plurality of through channels defined by a plurality of partition walls and extending through the honeycomb structural body in an axial direction, and a plurality of liquid flow passages formed to extend through the honeycomb structural body from an outer peripheral surface side of the honeycomb structural body; and the tank for the liquid is formed as a part of the container, and is constituted in such a maimer as to surround the honeycomb structural body such that the outer peripheral surface of the honeycomb structural body forms an inner peripheral surface of the tank for the liquid when the liquid-to-gas contact medium is disposed in the container.

* * * * *